(12) United States Patent
Perry et al.

(10) Patent No.: US 6,485,857 B2
(45) Date of Patent: Nov. 26, 2002

(54) FUEL CELL HYBRID FLOW FIELD HUMIDIFICATION ZONE

(75) Inventors: Michael L. Perry, South Glastonbury, CT (US); Timothy W. Patterson, East Hartford, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 11 days.

(21) Appl. No.: 09/751,600

(22) Filed: Dec. 29, 2000

(65) Prior Publication Data

US 2002/0106546 A1 Aug. 8, 2002

(51) Int. Cl.[7] .............................. H01M 2/00; H01M 8/02
(52) U.S. Cl. ............................. 429/34; 429/38; 429/26
(58) Field of Search ............................. 429/34, 38, 39, 429/26, 33

(56) References Cited

U.S. PATENT DOCUMENTS 5,641,586 A * 6/1997 Wilson ........................ 429/30
6,020,083 A * 2/2000 Breault et al. ................ 429/36

* cited by examiner

*Primary Examiner*—Stephen Kalafut
*Assistant Examiner*—R Alejandro
(74) *Attorney, Agent, or Firm*—M. P. Williams

(57) ABSTRACT

A PEM fuel cell oxidant flow field plate (12) having a substantial portion (77A) of the flow field formed of inter-digitated reactant flow channels (86, 87) includes a humidification zone coextensive with an electrolyte dry-out barrier (38). Within the humidification zone, the reactant flow channels are flow-through channels (89), which permits the inlet reactant flow to be sufficiently slow to permit adequate humidification of the inlet reactant gas from adjacent water, such as coolant water flow channels and/or the anode, to avoid electrolyte dry-out.

5 Claims, 3 Drawing Sheets

FUEL CELL HYBRID FLOW FIELD HUMIDIFICATION ZONE

TECHNICAL FIELD

This invention relates to humidification of unhumidified fuel cell reactant gases near the inlet of interdigitated reactant flow field channels by means of a humidification zone having non-interdigitated, low pressure flow-through flow paths, in which the dry incoming gases are exposed to a water transport plate and/or the anode but are not in contact with the membrane (or other reaction electrolyte).

BACKGROUND ART

In fuel cells employing a proton exchange membrane ("PEM") electrolyte, it is critical that a proper water balance be maintained within the PEM electrolyte. The process not only generates water at the cathode, but also drags water along with the ions from the anode through the PEM electrolyte to the cathode. If the electrolyte is dry, the process effectiveness suffers, due to increased ionic resistance and reactant cross over, which generates heat and results in membrane degradation, reducing the life of the fuel cell power plant.

In some fuel cells, the reactant gases are humidified before being introduced to the fuel cell, whereby the membrane is always provided with adequate moisture. However, this requires humidification equipment which increases the weight, volume and complexity of the fuel cell. In the case of fuel cells operating at substantially atmospheric pressure, thereby to avoid the need for having a compressor which increases parasitic power waste, it is preferred to utilize unhumidified reactant gases. When this is done, the reactant gases do not become humidified at the very entrance of the fuel cell, but only after flowing adjacent to a water transport plate and/or membrane electrode assembly for a sufficient distance to add adequate moisture to the reactant gas streams. Cells utilizing water transport plates are shown in commonly owned copending U.S. patent application Ser. No. 09/733,133 filed Dec. 8, 2000, incorporated herein by reference. Therefore, the use of unhumidified reactant gases will result in a portion of the electrolyte being dry, with attendant increase in ionic resistance and reactant cross over and reaction which results in heating and degradation of the electrolyte membrane.

In commonly owned copending U.S. patent application Ser. No. 09/731,307 filed on Dec. 6, 2000 and entitled "Fuel Cell With an Electrolyte Dry-Out Barrier", incorporated herein by reference, electrolyte dry-out barriers are provided to either or both of the anode and cathode reactant flow fields. The barriers prevent the fuel-containing gas and the oxidant gas streams from contacting the electrolyte prior to being at least partially humidified. The barriers extend for a small percentage (in the range of 3%–10%) of the total length of the flow field.

In some PEM fuel cells, it is known to use interdigitated flow fields, in which the inlet flow channels are not connected to the outlet flow channels such as in U.S. Pat. No. 5,641,586. This design causes the reactant gases to be transported by forced convection into the adjacent porous electrode substrates, which is more effective than the diffusion process in cells with conventional flow-through flow fields. Interdigitated flow fields are used to advantage particularly when the fuel cell is operating on dilute reactants, such as air or reformed hydrocarbon fuel, in which the extraction of the desired reactant gas component becomes more critical.

It has been found that utilization of an electrolyte dry-out barrier of the type described in the aforementioned application in conjunction with interdigitated flow fields, to an extent sufficient to eliminate electrolyte dry-out, results in too great a fraction of the electrolyte area being removed from active participation in the fuel cell process, thereby reducing the effectiveness of the fuel cell. Increasing the area of the electrolyte dry-out barrier increases the weight, volume and cost of the fuel cell. This is particularly undesirable for fuel cells used in vehicular applications.

DISCLOSURE OF INVENTION

Objects of the invention include provision of an improved reactant humidification zone in a fuel cell employing an interdigitated flow field; provision of a humidification zone in an interdigitated flow field which does not neutralize a prohibitively large fraction of the electrochemically active area.

According to the present invention, a reactant gas humidification zone in a fuel cell employing reactant gas flow field plates having interdigitated reactant flow channels includes an entry portion having flow-through flow channels coextensive with an electrolyte dry-out barrier, thereby significantly reducing the amount of electrolyte that must be protected from the unhumidified entry reactant gases.

According further to the invention, flow channels in the humidification zone are more narrow and more numerous than the flow field channels, thereby to provide additional oxidant contact area.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
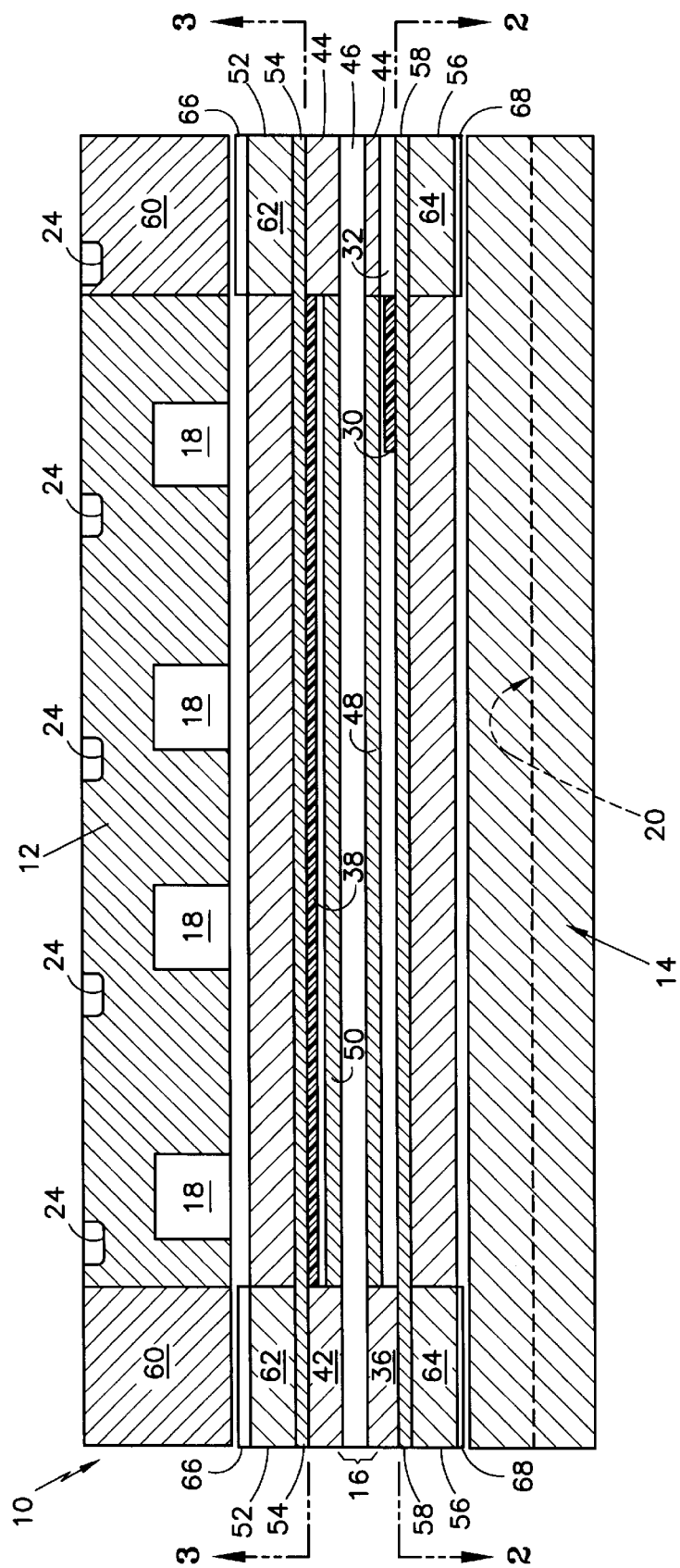
FIG. 1 is a simplified, stylized, sectional view of a prior art fuel cell having electrolyte dry-out barriers adjacent the oxidant and fuel flow fields.

The details of a fuel cell with an electrolyte dry-out barrier in accordance with the aforementioned copending application are first described as a foundation for the present invention. In FIG. 1, a fuel cell 10 with electrolyte dry-out barriers 30, 38 having edge seals 36, 42, 44, includes an MEA 16 disposed between the anode water transport plate 14 and the cathode water transport plate 12, which has oxidant flow field channels 18 and coolant channels 24. The MEA 16 includes an electrolyte 46, such as a PEM, secured between an anode catalyst 48 and a cathode catalyst 50. The fuel cell 10 may also include a porous cathode substrate layer 52 and a porous cathode gas diffusion layer 54 secured between the cathode water transport plate 12 and the cathode catalyst 50, as is well known in the art, and which layers are often referred to as an integral bi-layer. The fuel cell 10 may also include a porous anode substrate layer 56 and a porous anode gas diffusion layer 58 secured between the anode water transport plate 14 and the anode catalyst 48.

To prevent loss of reactant streams out of the cell 10 through peripheral edges of the above-described layers, it is common to seal peripheral edges of the layers as shown in U.S. Pat. No. 6,020,083, incorporated herein by reference. For example, a seal peripheral edge 60 of the cathode water transport plate 12, a seal peripheral edge 62 of the cathode porous substrate 52, and a seal peripheral edge 64 of the anode porous substrate 56 may be impregnated with a polymeric or an elastomeric sealant material. A cathode interfacial seal 66 of similar sealant material may be interposed between peripheral edges of layers between the cathode substrate 52 and the cathode water transport plate 12; and an anode interfacial seal 68 of sealant materials may be interposed between peripheral edges of the anode substrate 56 and the anode water transport plate 14. As shown in FIG. 1, the interfacial seal 66 may be disposed between the cathode water transport plate 12 and the cathode substrate layer 52, and an anode boundary seal 68 may be disposed between the anode water transport plate 14 and the anode substrate layer 56, or between peripheral edges of all the layers, to prevent reactant streams and/or product fluids from leaving the cell 10 through edges of the cell layers.

It is known to one skilled in the art that a fuel cell utilizing external reactant manifolds only requires edge seals on two edges of each anode and cathode compartment. Such edge seals are incorporated into the edges that are in contact with an opposite reactant. Referring to the view shown in FIG. 1, the cathode seal 62 is exposed to fuel gas and is necessary. In contrast, the anode seal 64 is exposed to the fuel gas and is not necessary. If the anode seal 64 were to be eliminated, the anode electrolyte dry-out barrier 30 shown in FIG. 1 would be extended to a beginning point 72 (shown in FIG. 2) of the fuel inlet 32.

Figure 2:
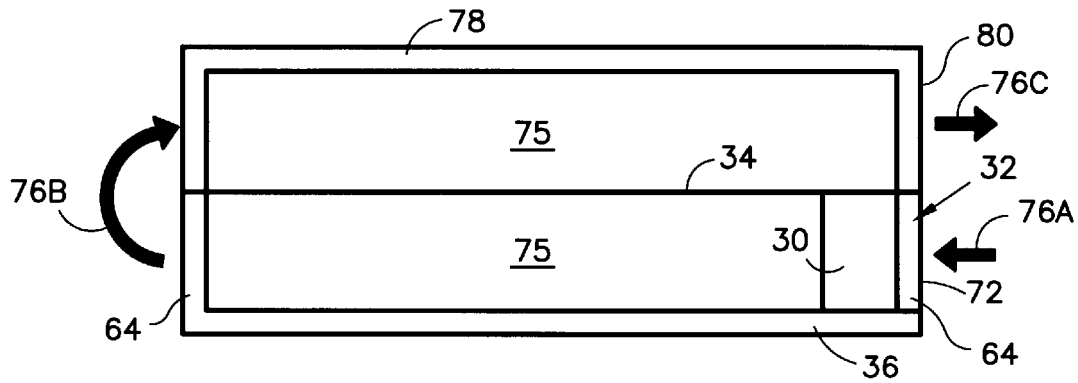
FIG. 2 is a stylized plan view of the anode flow field in the fuel cell of FIG. 1.

For purposes of understanding the present invention, a peripheral region adjacent the anode gas diffusion layer 58 is at a fuel inlet 32. As shown in FIGS. 1 and 2, the width of the fuel inlet 32 extends from a beginning point 72 a distance that is about the same as the extent of the seal edge 64 of the anode substrate 56. The fuel stream passing through the fuel inlet 32 next passes through an anode flow field 75 that directs the reducing fluid to pass adjacent the anode catalyst 48. The anode flow field 75 may consist of the fuel inlet and outlet channels 20 within the anode water transport plate 14 along with open pores within the anode substrate 56, and anode gas diffusion layer 58. The direction of fuel flow through the anode flow field 75 in FIG. 2 is shown by arrows 76A–76C; arrow 76B also represents a turn in the direction of flow of the fuel gas (accomplished by a manifold, not shown, secured to the fuel cell 10, as is well known in the art). The fuel gas flow path through the anode flow field 75 therefore includes all of an area from the beginning point 72, between the first reducing fluid edge seal 36 and the reducing fluid flow barrier 34, but not the area through the turn represented by the arrow 76B, and between the reducing fluid flow barrier 34 and a second reducing fluid edge seal 78 and a fuel flow path end point 80 adjacent a peripheral edge of the anode catalyst 48. The invention may apply to a fuel flow path through an anode flow field 75 that does not include a turn, or that includes a plurality of turns.

An oxidant inlet 40 (FIG. 3) is defined by a peripheral region of the cathode substrate 52 covered with a sealant material, and extends from a beginning point 74 (FIG. 3) a distance that is about the same as the seal edge 62 of the cathode substrate 52. The process oxidant stream that passes through the oxidant inlet 40 next passes through a cathode flow field 77 that directs the oxidant stream to pass adjacent the cathode catalyst 50. The cathode flow field 77 may consist of oxidant channels 18 defined within the cathode water transport plate 12 along with open pores within the cathode substrate 52 and the cathode gas diffusion layer 54. The direction of flow of the oxidant through the cathode flow field 77, shown in FIG. 3 by directional arrows 82A–82H is straight through the cathode flow field 77 in a direction perpendicular to flow of the fuel stream through the anode flow field 75. The oxidant flow path includes all of an area from the beginning point 74 (FIG. 3) to an end point 84 adjacent and between a peripheral edge seal 62 of the cathode substrate 52.

In FIGS. 1 and 2, the anode electrolyte dry-out barrier 30 is secured between the electrolyte 46 and the anode water transport plate 14 and extends from the edge of the inlet 32, along the fuel flow path in anode flow field 75, a distance that is adequate for the fuel gas flowing through the anode flow field 75 to become saturated with water that is within the anode flow field 75, such as water from the anode water transport plate 14. Similarly, the cathode electrolyte dry-out barrier 38 is secured between the electrolyte 46 and the cathode water transport plate 12 and extends from the edge of the oxidant inlet 40, along the oxidant flow path in the cathode flow field 77, a distance that is adequate for the oxidant stream flowing through the cathode flow field 77 to become saturated with water that is within the cathode flow field, such as water from the cathode water transport plate.

The anode electrolyte dry-out barrier 30 may be formed by applying a coating or film of a dry-out barrier material to, or impregnating with the dry-out barrier material, the anode gas diffusion layer 58 (as shown in FIG. 1), or the anode substrate layer 56, within the above described boundaries relative to the fuel flow path through the fuel cell 10 to define the anode electrolyte dry-out barrier 30. Similarly, the cathode electrolyte barrier 38 may be formed by applying a coating or film of a dry-out barrier material to, or impregnating with the dry-out barrier material, the cathode gas diffusion layer 54 (as shown in FIG. 1), or the cathode substrate layer 52, within the above-described boundaries relative to the oxidant flow path through the fuel cell 10 to define the cathode electrolyte dry-out barrier 38.

Preferred dry-out barrier materials may be materials well-known in the art that are compatible with a working environment of the fuel cell 10, such as plastic, polymer, elastomer, or resin materials having low water absorption properties, or a compatible metal, wherein the dry-out materials are capable of preventing water from moving through the material, such as preventing water from moving from the electrolyte through the material to the adjacent anode or cathode flow fields 75, 77. Exemplary sealants that may be utilized as dry-out barrier materials are described in U.S. Pat. No. 6,020,083 (incorporated herein by reference) as "elastomer sealant materials", such as "FLOUROLAST" grade SB or WB manufactured by Flourolast, a Laureen division, with an inert filler such as silicon carbide, or alternatively, "SLYGARD", manufactured by Dow Chemical Corporation.

Figure 3:
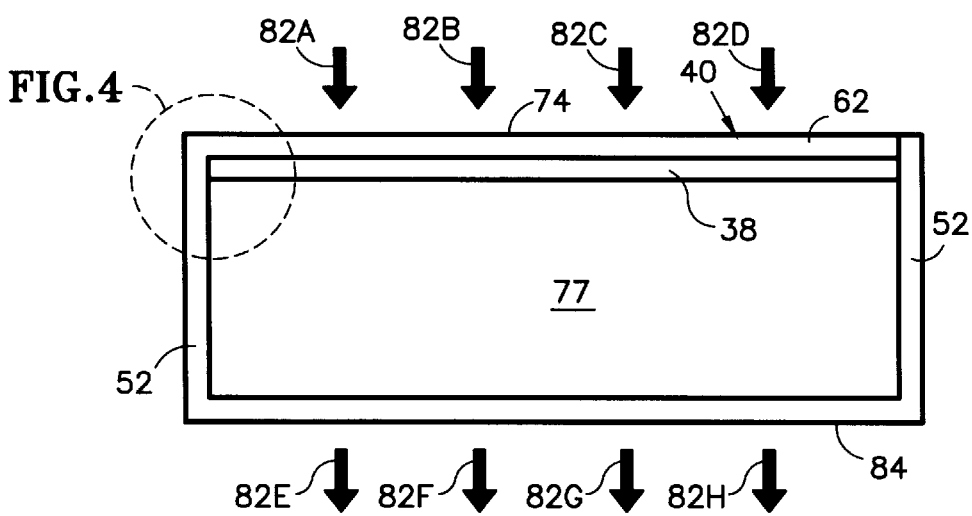
FIG. 3 is a stylized plan view of the cathode flow field in the fuel cell of FIG. 1.
Figure 4:
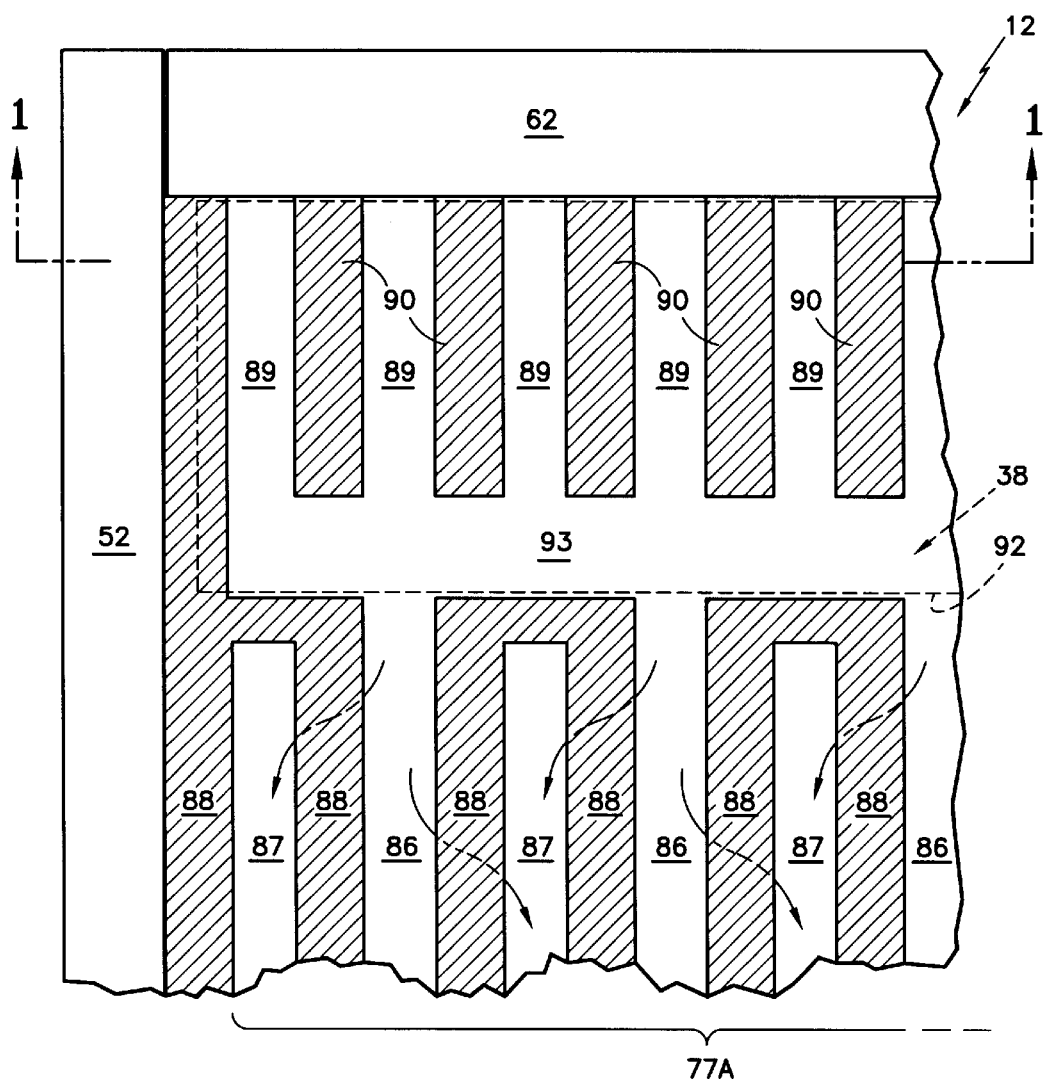
FIG. 4 is a fragmentary, stylized, sectioned plan view of a portion of the cathode flow field of FIG. 3 modified to incorporate the present invention.

The invention is described with respect to FIG. 4, which is a fragmentary view corresponding to the dotted circle in FIG. 3, illustrating how the prior fuel cell having flow-through oxidant flow channels may be modified in accordance with the invention so as to accommodate flow fields employing interdigitated flow channels. In FIG. 4, a substantial portion of the flow field 77A (on the order of 90% or 95%) includes interdigitated flow channels formed by a serpentine rib 88, or in any other suitable, customary fashion; inlet flow channels 86 have no outlet, so the oxidant gas is transported into the porous cathode substrate layer 52

(FIG. 1) by forced convention and then enters the outlet channels 87, as illustrated by the flow arrows in FIG. 4. The inlet flow channels 86 in FIG. 4, in a cell with interdigitated flow fields, occupy approximately one-half of the area of the non-interdigitated cathode flow field 77 in FIG. 3. The rate of flow into the inlet channels 86 is higher than it would be in flow-through oxidant channels by approximately a factor of two (as in the aforementioned application).

The increased flow per inlet channel 86, and the increased mass transfer beneath the rib 88 due to convective flow results in excessive dry-out of the PEM in the entry portion of the reactant flow fields of a cell with interdigitated flow fields. This results in the dry-out barrier in a cell with interdigitated flow fields being approximately twice as large, or larger, than the dry-out barrier in cells with conventional flow fields. This is undesirable for the aforementioned reasons of wanting to minimize cell volume and weight of fuel cells, especially those used in vehicular applications. According to the invention, the linear flow rate of oxidant within the humidification zone is lowered by utilizing flow-through channels 89 formed between ribs 90, the linear flow rate of oxidant in the flow-through channels 89 is sufficiently slower so that there is an adequate exposure of the oxidant to the water in the water transport plate to provide the required humidification in a flow distance which is much less than that which would be required if the humidification zone were imposed directly over the interdigitated flow channels 86, 87. According to another aspect of the invention, the size of the humidification zone is further decreased by increasing the contact area between the reactant and the surface of the water transport plate. This is accomplished by having more channels by making the width of the flow through channels 89 and ribs 90 in the humidification zone significantly narrower than the width of the interdigitated reactant flow channels 86 and ribs 88. The greater number of channels provides more channel side surfaces, and thus more contact area. It is preferred that the width of flow through channels 89 and ribs 90 be 25 to 75 percent narrower than the channels 86 and ribs 88. This is feasible because the length of the flow through channels is small and the resultant pressure drop is acceptable.

In FIG. 4, the cathode electrolyte barrier 38 is represented in dotted lines and extends from the seal 62 to an edge 92, the position of which may be varied to suit the humidification process in any given implementation of the invention, as well as the support requirements for uniform axial loading. In the general case, the electrolyte dry-out barrier 38 should extend past the flow-through channels 89 and flow transition area 93 between the flow-through oxidant channels 89 and the interdigitated inlet flow channels 86. FIG. 1 shows the anode catalyst 48 to extend under the dry-out barrier 30, and also shows the electrolyte 46 extending beyond the dry-out barrier 30. The dimensions of the catalyst layers and electrolyte may be modified without departing from the invention. The invention as described with respect to FIG. 4 has been in terms of the oxidant flow field at the cathode; however, the invention may equally well be practiced in the fuel flow field of the anode, in an obvious fashion. FIG. 1 is descriptive of the flow-through channel portion of the flow field of FIG. 1, as illustrated by the section line 1—1 in FIG. 4. FIG. 4 is greatly exaggerated and not to scale. The width of the flow channels 89 may be on the order of 1 mm (40 mils) wide, and may be between 5–20 percent of the length of the reactant gas flow path through the flow field.

Although this invention has been described in terms of reactant flow channels in the dry-out barrier zone, other flow field geometries are known and are suitable for use with this invention.

The invention may be practiced in fuel cells with electrolytes other than PEM.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell stack assembly comprising a plurality of fuel cells stacked one adjacent another, each of said fuel cells including an electrolyte with means forming electrodes including an anode on one face of said electrolyte and means forming a cathode on an opposite face of said electrolyte, said anode and said cathode each having a porous reactant flow field plate having water flow channels and reactant gas flow channels disposed adjacent thereto, at least one of said flow field plates having interdigitated reactant gas flow channels;

wherein the improvement in said at least one interdigitated flow field plate comprises:
a humidification section adjacent to an inlet to said interdigitated flow field plate, said humidification section including an electrolyte dry-out barrier disposed between said electrolyte and said at least one reactant flow field plate for restricting movement of water from the electrolyte into a reactant fluid stream passing through said one reactant flow field, said barrier extending from the inlet of said at least one flow field plate to permit humidification of the reactant fluid stream with water from within said water flow channels, said humidification section including flow-through reactant flow field channels substantially coextensive with said dry-out barrier.

2. An assembly according to claim 1 wherein said flow-through reactant flow field channels extend into said flow field a distance no greater than about that distance required to permit humidification of the corresponding inlet reactant gas to avoid electrolyte dry-out.

3. An assembly according to claim 1 wherein said flow-through reactant flow field channels extend into said flow field about 5–20 percent of the length of the reactant gas flow path through the flow field.

4. An assembly according to claim 1 wherein said electrolyte is a proton exchange membrane.

5. A fuel cell stack assembly comprising a plurality of fuel cells stacked one adjacent another, each of said fuel cells including an electrolyte with means forming electrodes including an anode on one face of said electrolyte and means forming a cathode on an opposite face of said electrolyte, said anode and said cathode each having a porous reactant flow field plate having water flow channels and reactant gas flow channels disposed adjacent thereto, at least one of said flow field plates having reactant gas flow channels selected from flow-through flow field channels and interdigitated flow field channels;

wherein the improvement in said at least one flow field plate comprises:
a humidification section adjacent to an inlet to said at least one flow field plate, said humidification section including an electrolyte dry-out barrier disposed between said electrolyte and said at least one reactant flow field plate for restricting movement of water from the electrolyte into a reactant fluid stream passing through said one reactant flow field, said barrier extending from the inlet of said at least one flow field plate to permit humidification of the reactant fluid stream with water from within said water flow channels, said humidification section including flow-through reactant flow channels substantially coextensive with said dry-out barrier, said flow-through reactant flow channels having a width between 0.25 and 0.75 the width of said reactant gas flow channels.

* * * * *